(12) United States Patent
Liao et al.

(10) Patent No.: US 10,206,171 B2
(45) Date of Patent: *Feb. 12, 2019

(54) METHOD FOR SCHEDULING WAKE/SLEEP CYCLES BY A CENTRAL DEVICE IN A WIRELESS NETWORK

(71) Applicant: THOMSON LICENSING, Issy-les-Moulineaux (FR)

(72) Inventors: Ning Liao, Beijing (CN); Jian Feng Chen, Beijing (CN); Xiao Jun Ma, Beijing (CN)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/281,877

(22) Filed: Sep. 30, 2016

(65) Prior Publication Data

US 2017/0019854 A1 Jan. 19, 2017

Related U.S. Application Data

(63) Continuation of application No. 12/655,374, filed on Dec. 30, 2009, now Pat. No. 9,497,704.

(30) Foreign Application Priority Data

Jan. 6, 2009 (EP) .................... 09305006

(51) Int. Cl.
*H04W 52/02* (2009.01)
*H04W 52/26* (2009.01)
(Continued)

(52) U.S. Cl.
CPC ... *H04W 52/0216* (2013.01); *H04W 52/0225* (2013.01); *H04W 52/26* (2013.01);
(Continued)

(58) Field of Classification Search
CPC .... G06F 1/3203; G06F 1/3278; G06F 1/3287; H04B 1/0003; H04B 1/0475;
(Continued)

(56) References Cited

U.S. PATENT DOCUMENTS 6,901,066 B1 5/2005 Helgeson
7,418,004 B2 8/2008 Chou
(Continued)

FOREIGN PATENT DOCUMENTS

CN 101035129 A 9/2007
CN 101114858 A 1/2008
(Continued)

OTHER PUBLICATIONS

"Improving Energy Efficiency of Centrally Controlled Wireless Data Networks", John A. Stein and Gustavo De Veciana, The University of Texas at Austin, Austin, TX 78712, USA.*
(Continued)

*Primary Examiner* — Yuwen Pan
*Assistant Examiner* — Paul P Tran
(74) *Attorney, Agent, or Firm* — Tutunjian & Bitetto, P.C.

(57) ABSTRACT

Methods and systems for scheduling wake/sleep cycles by a central device in a wireless network that have at least one mobile device include determining a system reference cycle as a minimum value of a delay constraint on a real-time service for each mobile device of the at least one mobile device that has a real-time service. A wake/sleep cycle length is attributed to each mobile device. The wake/sleep cycle length is an integer multiple of the system reference cycle such that a wake/sleep cycle length of a first mobile device is different from that of a second mobile device. A sleep period and a wake period are assigned within the wake/sleep cycle of each mobile device. The wake/sleep
(Continued)

cycle of each mobile device is arranged to avoid collision of the wake period with those of other mobile devices.

18 Claims, 6 Drawing Sheets

(51) Int. Cl.
*H04W 74/08* (2009.01)
*H04W 74/02* (2009.01)
*H04W 74/04* (2009.01)
*H04L 12/801* (2013.01)
*H04L 12/851* (2013.01)

(52) U.S. Cl.
CPC .......... *H04L 47/14* (2013.01); *H04L 47/2425* (2013.01); *H04W 74/02* (2013.01); *H04W 74/04* (2013.01); *H04W 74/08* (2013.01); *Y02D 70/00* (2018.01); *Y02D 70/142* (2018.01); *Y02D 70/146* (2018.01); *Y02D 70/168* (2018.01); *Y02D 70/23* (2018.01)

(58) Field of Classification Search
CPC .... H04B 1/1615; H04B 1/3888; H04B 1/406; H04J 13/0044; H04L 1/0026; H04L 1/20; H04L 5/023; H04L 41/5003; H04L 41/5019; H04L 47/14; H04L 47/2425; H04W 24/02; H04W 52/0203; H04W 52/0212; H04W 52/0216; H04W 52/0225; H04W 52/0232; H04W 52/0274; H04W 52/029; H04W 52/228; H04W 52/245; H04W 52/287; H04W 52/362; H04W 52/367; H04W 52/04; H04W 52/44; H04W 48/08; H04W 48/10; H04W 56/002; H04W 72/1257; H04W 74/02; H04W 74/002; H04W 74/04; H04W 74/06; H04W 74/08; H04W 76/048; H04W 88/06; H04W 88/185

See application file for complete search history.

(56) References Cited

U.S. PATENT DOCUMENTS

| | | | |
|---|---|---|---|
| 8,233,456 B1* | 7/2012 | Kopikare | H04W 52/0216 370/332 |
| 2003/0181216 A1 | 9/2003 | Tsai et al. | |
| 2005/0025081 A1* | 2/2005 | Wakamatsu | H04B 1/1615 370/311 |
| 2005/0043068 A1 | 2/2005 | Shohara et al. | |
| 2005/0059437 A1 | 3/2005 | Son et al. | |
| 2005/0070340 A1 | 3/2005 | Kim et al. | |
| 2005/0017530 A1 | 6/2005 | Abraham et al. | |
| 2005/0117530 A1 | 6/2005 | Abraham et al. | |
| 2005/0135302 A1 | 6/2005 | Wang et al. | |
| 2005/0221869 A1* | 10/2005 | Liu | G06F 1/3209 455/574 |
| 2006/0050730 A1 | 3/2006 | Shvodian | |
| 2006/0062181 A1 | 3/2006 | Chou | |
| 2006/0073791 A1 | 4/2006 | Senarath et al. | |
| 2006/0140135 A1* | 6/2006 | Bonta | H04L 45/04 370/254 |
| 2006/0252449 A1 | 11/2006 | Ramesh | |
| 2007/0064662 A1 | 3/2007 | Bultan et al. | |
| 2008/0009328 A1 | 1/2008 | Narasimha | |
| 2008/0025279 A1 | 1/2008 | Young et al. | |
| 2008/0090574 A1 | 4/2008 | Soong et al. | |
| 2008/0182567 A1 | 7/2008 | Zhu et al. | |
| 2008/0186892 A1 | 8/2008 | Damnjanovic | |
| 2008/0219198 A1 | 9/2008 | Honkasalo et al. | |
| 2009/0168744 A1 | 7/2009 | Park | |
| 2010/0097969 A1* | 4/2010 | De Kimpe | H04W 52/0216 370/311 |
| 2010/0278087 A1* | 11/2010 | Kawakami | H04W 52/0216 370/311 |

FOREIGN PATENT DOCUMENTS

| | | |
|---|---|---|
| CN | 101184004 A | 5/2008 |
| JP | 2005026862 | 1/2005 |
| JP | 2010514314 | 4/2010 |
| TW | I251999 | 9/1993 |
| TW | 200611518 | 4/2006 |
| WO | WO0223760 A1 | 3/2002 |
| WO | WO 2008/005689 A2 | 1/2008 |
| WO | WO2008075239 A2 | 6/2008 |

OTHER PUBLICATIONS

Fang, G. et al. "Improving Mobile Station Energy Efficiency in IEEE 802.16e WMAN by Burst Scheduling," Global Telecommunications Conference, Nov. 2006. GLOBECOM '06. IEEE. pp. 1-5.

Huang, S. et al. "Energy Efficient Scheduling with QoS Guarantee for IEEE 802.16e Broadband Wireless Access Networks," Proceeding IWCMC '07 Proceedings of the 2007 international conference on Wireless communications and mobile computing, Aug. 2007, pp. 547-552.

Ferng, H. et al. "A Scheduling-Based Delay-Tolerant Power Saving Scheme for the IEEE 802.16e Wireless MAN," Vehicular Technology Conference, May 2008. VTC Spring 2008. IEEE, pp. 2321-2325.

Tsao, S. et al. "Energy-efficient packet scheduling algorithms for real-time communications in a mobile WiMAX system," Computer Communications, vol. 31 Issue 10, Jun. 2008. pp. 2350-2359.

Tian, L. et al. "Energy Efficient Integrated Scheduling of Unicast and Multicast Traffic in 802.16e WMANs," Global Telecommunications Conference, Nov. 2007. GLOBECOM '07. pp. 3478-3482.

Search Report dated Jun. 2, 2009.

* cited by examiner

METHOD FOR SCHEDULING WAKE/SLEEP CYCLES BY A CENTRAL DEVICE IN A WIRELESS NETWORK

FIELD OF THE INVENTION

The present invention relates generally to the power management in a wireless network, and more particularly, to a method for scheduling wake/sleep cycles by a central device in a wireless network.

BACKGROUND OF THE INVENTION

A major constraint for many mobile applications (e.g., mobile TV, VOD (Voice on Demand)) is the limited capacity and lifetime of the batteries of mobile devices. It is reported that in a small-size mobile device like a PDA (Personal Digital Assistant), the percentage of power drained by the wireless interface is up to 50% of the overall system consumption. Without a power management module on the wireless interface, the energy of a mobile device can be drained out quickly. Therefore, energy management of wireless interface has become an important issue.

In view of the above issue, a sleep mode was proposed for wireless networks, in which ideally a mobile station (MS) will power down its wireless interface with a base station (BS) to enter into a sleep state when there is no data for it to receive or transmit, and wake up only when there is data for it. The sleep mode intends to minimize MS power consumption and decrease usage of BS air interface resources. It is also a main task of the energy management to schedule the state (i.e. sleep or wakeup) transition of the wireless interface of the MS in order to minimize its energy consumption because the state transition between sleep and wakeup will also consume energy. In order to reduce the frequency of state transitions, a solution was proposed for the sleep mode to buffer and deliver data in a burst manner, for example, by the slicing technique of DVB-H.

FIG. 1 is an exemplary diagram showing a scheduling method with a burst manner for power-saving of a MS in a wireless network in the prior art. FIG. 1(*a*) shows the sleep mode with an immediate transmission manner for comparison with the sleep mode with the burst manner shown in FIG. 1(*b*).

As shown in FIG. 1(*a*), the MS enters into a sleep state in sleep time slots and wakes up to send or receive data packets in wakeup time slots indicated by the pulse parts in the FIG. 1(*a*). Now referring to FIG. 1(*b*), a periodic sleep mode with the burst manner is shown, in which a sleep cycle period for the MS is divided into a sleep window and a listening window. In the sleep window, the MS can power off the corresponding wireless interface or puts the wireless interface at a low power level. In the listening window, the MS wakes up, i.e., powers on the wireless interface to receive and/or send its data packets. Packets, arriving at or destined to the MS, are buffered and then transmitted in a burst manner within the listening window.

Before entering into the periodic sleep mode, the MS negotiates with the BS about the length (in the units of the physical (PHY) frame) of the listening window, the length of the sleep window, and the starting PHY frame from which the MS starts the periodic sleep cycle. As shown in FIG. 1(*b*), the sleep window can be set as the maximum packet delay of this MS.

Comparing with the immediate transmission manner, which is shown in FIG. 1(*a*), the sleep mode with the burst manner can obviously reduce the frequency of state transitions, which will in turn reduce the power consumption. But on the other hand, this solution will lead to longer packet delay. The trade-off between the power-saving and the packet delay for IEEE 802.11 network was already studied.

However, existing scheduling methods for IEEE802.11 power management can not readily satisfy the objective of saving power and maintaining QoS (Quality of Service) guarantee simultaneously in such wireless network as IEEE802.16e, where QoS requirements are explicitly specified.

In addition, for IEEE 802.16e systems, existing research only focuses on adaptive sleep mechanisms for web browsing service and on single-MS environments. However, in practical operation, there is usually more than one MS in the regime of a BS.

As described above, the sleep mode is used in wireless networks for power saving of the MSs. Full information regarding the sleep mode is given in the IEEE standard "IEEE802.16e-2005".

In a wireless network having multiple MSs associated with a BS, the transmission of traffic of these MSs will be influenced from each other because the system radio resource is shared among all these MSs instead of being dedicated to one MS among them. FIG. 2 is a diagram showing resource collision in a multi-MSs wireless network in the prior art. In FIG. 2, three mobile stations MS1, MS2 and MS3 are shown, assigned with the sleep cycle periods of 5, 11 and 18 time slots respectively according to the traditional power-efficient scheduling method for a single-MS environment. In each sleep cycle period, the pulse parts denote the time slots of the listening window for this MS. The sleep cycle period is generally less than the maximum packet delay requirement of an application running on the MS. Otherwise, the QoS requirements of the service cannot be guaranteed.

As shown in FIG. 2, under the time divisional protocol, one time slot can only be allocated to one MS as the listening window. If the time slot 10 is allocated to MS1 as listening window to satisfy its power-saving schedule, the schedule of MS2 cannot be satisfied at the same time. Otherwise, a resource collision will take place for time slot 10, as marked by black parts in FIG. 2. This kind of collision also takes place at time slots 35, 54 and 55. Therefore, the design of a good power-saving scheduling algorithm with Quality of Service (QoS) guarantee for multi-MSs environment is of more practical importance but also more complex.

For the IEEE 802.16e network, several scheduling approaches were proposed to carry out a power-saving schedule of multiple MSs and at the same time maintain the QoS guarantee.

In an approach 1 described by a paper "Improving mobile station energy efficiency in IEEE 802.16e WMAN by burst scheduling, G. Fang, E. Dutkiewicz, Y. Sun, J. Zhou, J. Shi, Z. Li, IEEE Globecom, 2006", the MS that has the shortest time to reach its maximum bit rate requirement is selected as the primary MS. The scheduler of the BS allocates almost all the bandwidth in a burst to the primary MS and allocates just enough bandwidth to other awake-state MSs to guarantee their minimum data rate requirements.

This approach 1 does not take into consideration real-time services that have packet delay constraints (there is no such constraint for non-real-time services). Some studies show that this approach cannot conserve energy efficiently for TV-like multicast services having static periodic schedule pattern. Besides, it requires a lot of signaling exchanges, which will not only cost bandwidth but also introduce signalling transmission delay. Please note that the types of data delivery services, including the real-time service and non-real-time service, are defined in the above mentioned IEEE801.16-2005 standard, where full information concerning the definition and requirements of each type of services is given.

A paper "Energy efficient integrated scheduling of unicast and multicast traffic in 802.16e WMANs, Lin Tian, et. al., IEEE GLOBECOM 2007" described an approach 2 that proposed to firstly allocated resources to real-time multicast services in a periodic burst manner to save power. In this approach 2, remaining resources are allocated to non-real-time unicast services in an order that resources are firstly allocated to the multicast-group-member MS and then to the MS that only have unicast services. The resource allocated to the unicast service of a multicast-group-member MS is adjacent to the resources for its multicast service. FIG. 3 is an exemplary diagram showing the power-efficient scheduling method of the approach 2. FIG. 3(a) shows resources initially allocated to the unicast and the multicast services for MS1 to MS4 respectively. FIG. 3(b) shows resources allocated to the unicast and the multicast services of each MS are allocated to be adjacent to each other. In fact, the approach 2 assumes that the delay constraints of all the real-time multicast services are the same. It cannot be extended to the general environment where multiple real-time services with different delay constraints (e.g., VoIP and video) exist.

According to an approach 3 in a paper "Energy Efficient Scheduling with QoS Guarantee for IEEE802.16e Broadband Wireless Access Networks Shih-Chang Huang, Rong-Hong Jan., Chien Chen, (2007 IWCMC)", in a case that multiple MSs have real-time services with different delay constraints, a common sleep cycle period is determined by choosing the minimum delay constraints among all services of the MS. All MSs periodically sleep and wake up to receive their data with the common sleep cycle period. FIG. 4 shows the power-efficient scheduling method of the approach 3. As shown in FIG. 4, the common sleep cycle period in this example is 6 frames long for five MSs A, B, C, D and E. The BS computes the number of frames needed for the MSs it serves. Since one frame slot can only be allocated to one MS, the BS schedules MS E in the $1^{st}$ frame, and delays the starting times of MS D, C, B and A respectively to the $2^{nd}$, $4^{th}$, $5^{th}$, and $6^{th}$ frames within each sleeping cycle period. In this way, the allocated frames can be scheduled without overlapping, that is, without resource collision issue.

The advantage of the approach 3 is that it has a simple scheduling algorithm. However, with a common scheduling cycle for all MSs, a MS having larger delay constraints and thus having larger sleep cycle period than the common cycle period will apparently have to perform the state transition more frequently than it is scheduled in the single-MS environment. As described above, state transition between sleep and wakeup will also consume a large amount of energy, which is generally more than one slot unit of energy consumed in wakeup state. Therefore, approach 3 will lead to more energy consumption for the MSs with delay constraints that are larger than the common scheduling period.

SUMMARY OF THE INVENTION

According to one aspect of the invention, a method for scheduling wake/sleep cycles by a central device in a wireless network is provided. The wireless network comprises at least one mobile device. The method comprises: attributing a wake/sleep cycle length to each mobile device, wherein the wake/sleep cycle length is an integer multiple of a system schedule cycle; assigning a sleep period and a wake period within the wake/sleep cycle of each mobile device; and arranging the wake/sleep cycle of each mobile device to avoid collision of the wake period with those of other mobile devices.

According to one aspect of the invention, a method for scheduling wake/sleep cycles of a mobile device is provided. The method comprises the steps of: receiving from a central station scheduling data for a sleep/wake cycle, wherein the sleep/wake cycle length is defined as an integer multiple of a system schedule cycle; and waking and setting to sleep the appropriate circuits as a function of the scheduling data.

BRIEF DESCRIPTION OF DRAWINGS

These and other aspects, features and advantages of the present invention will become apparent from the following description in connection with the accompanying drawings in which.

DETAIL DESCRIPTION OF PREFERRED EMBODIMENTS

In the following description, various aspects of an embodiment of the present invention will be described. For purposes of explanation, specific configurations and details are set forth in order to provide a thorough understanding. However, it will also be apparent to one skilled in the art that the present invention may be practiced without the specific details present herein.

In view of the disadvantages of the above approaches, a power-saving scheduling method for multiple MSs with various types of services in a wireless network is provided in accordance with an embodiment of the present invention. According to the general concept of the method, a relatively static service schedule pattern is firstly designed to reduce power consumption of MSs having real-time services and satisfy their minimum QoS requirement. Because the minimum QoS rate and maximum delay of all MSs having real-time services are negotiated early at each service establishment, it can be regarded as pre-known traffic from the viewpoint of the service scheduler. Further, the traffic that is non-predictable (e.g., traffic produced by web browsing and FTP download) is scheduled on the fly to fully utilize the remaining system resources and to achieve fairness and reduced power consumption at the same time.

For the scheduling of MSs having real-time services, there is the resource collision problem, as described above in FIG. 2. According to the method of the embodiment, a system reference cycle period is firstly determined. Then the scheduling cycle period of each MS is set as an integer multiple of the system reference cycle period. A sleep window and a wake window are assigned within the wake/sleep cycle of each mobile device and also the scheduling cycle period of all the MSs are arranged to avoid collision of the wake windows among each other. According to the solution, at the beginning of scheduling, the start frame of sleep mode of each MS is adjusted within one system scheduling cycle in order to avoid the potential resource collision. That is, once the resource collision problem is settled at the beginning of the scheduling, no more scheduling is need in the subsequent scheduling cycles in view of the resource collision.

In this embodiment, the system reference will be less than the minimum value of delay constraints of all MSs having real-time services. The "delay constraint" of a MS may be defined as the maximum delay constraint among all the real-time services running on the MS.

The scheduling cycle period of a MS can be set as large as possible but less than its maximum delay constraint. Additionally, each MS can be set to keep its own sleep window as large as possible if the wake window will not collide with those of the other MSs.

Figure 5:
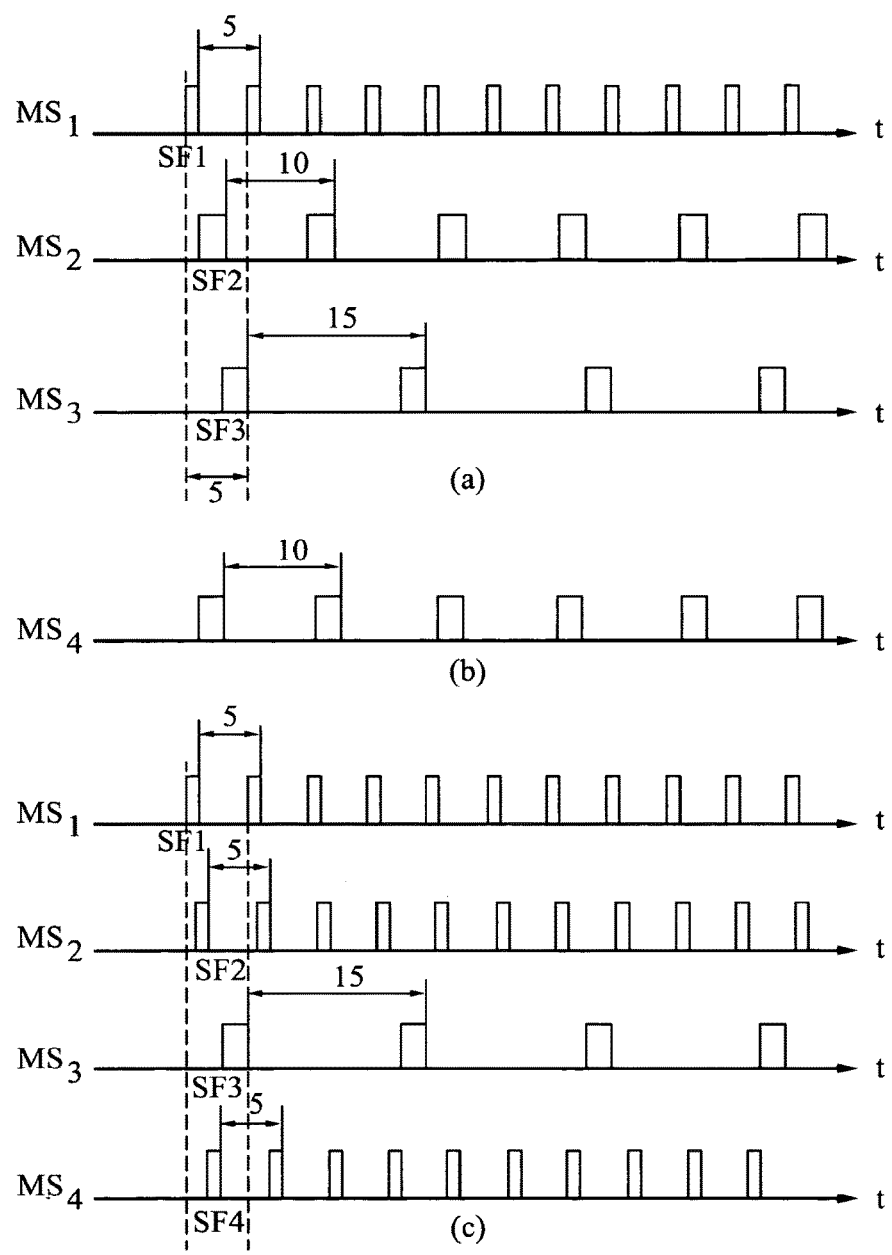
FIG. 5 is an exemplary diagram showing an embodiment of the scheduling method in accordance with the principle of the present invention.

FIG. 5 shows an embodiment of the scheduling method in accordance with the principle of the present invention, which aims to keep the maximum sleep cycle period of each MS to guarantee the QoS requirement and to efficiently utilize the system bandwidth.

Figure 1:
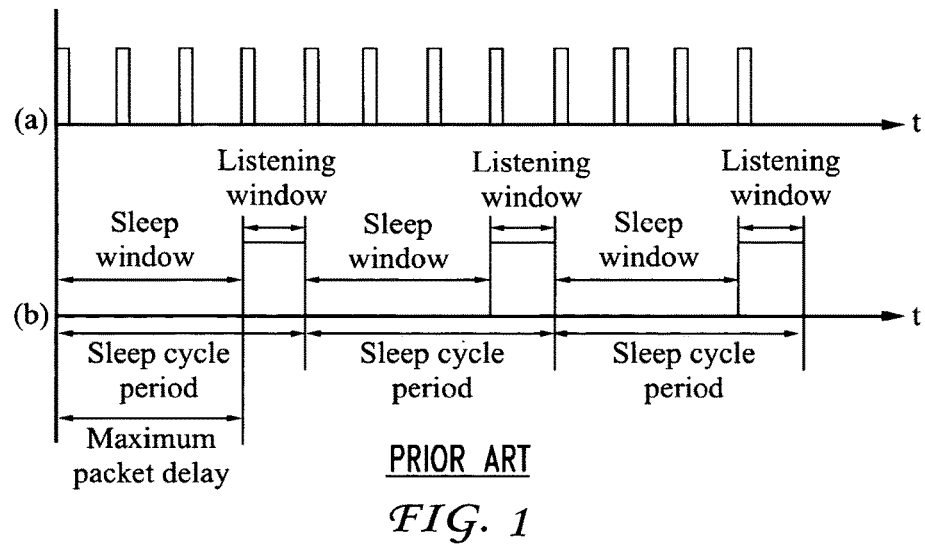
FIG. 1 is an exemplary diagram showing a scheduling method with a burst manner for the power-saving of a MS in wireless network in the prior art.
Figure 2:
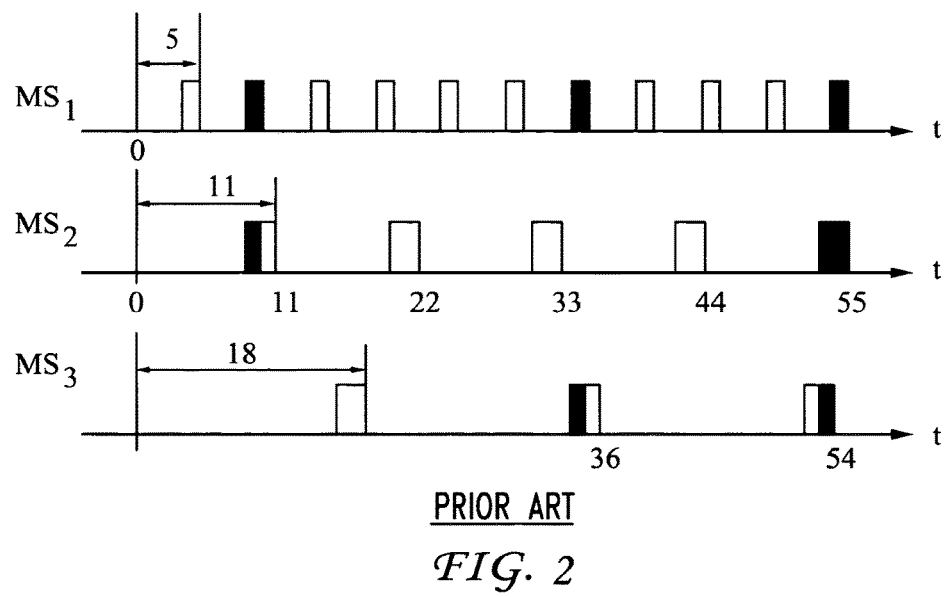
FIG. 2 is a diagram showing resource collision in a multi-MSs wireless network in the prior art.
Figure 3:
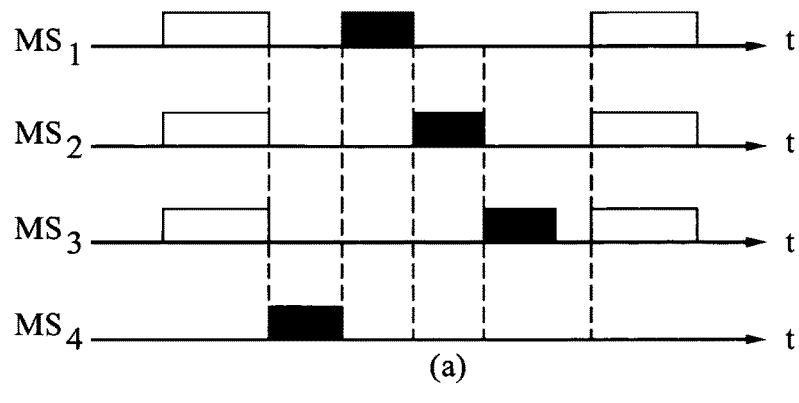
FIG. 3 is an exemplary diagram showing a power-efficient scheduling method in the prior art.
Figure 3:
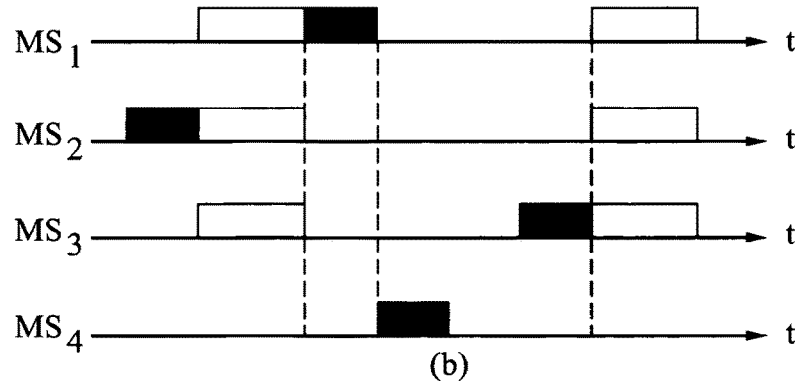
Figure 4:
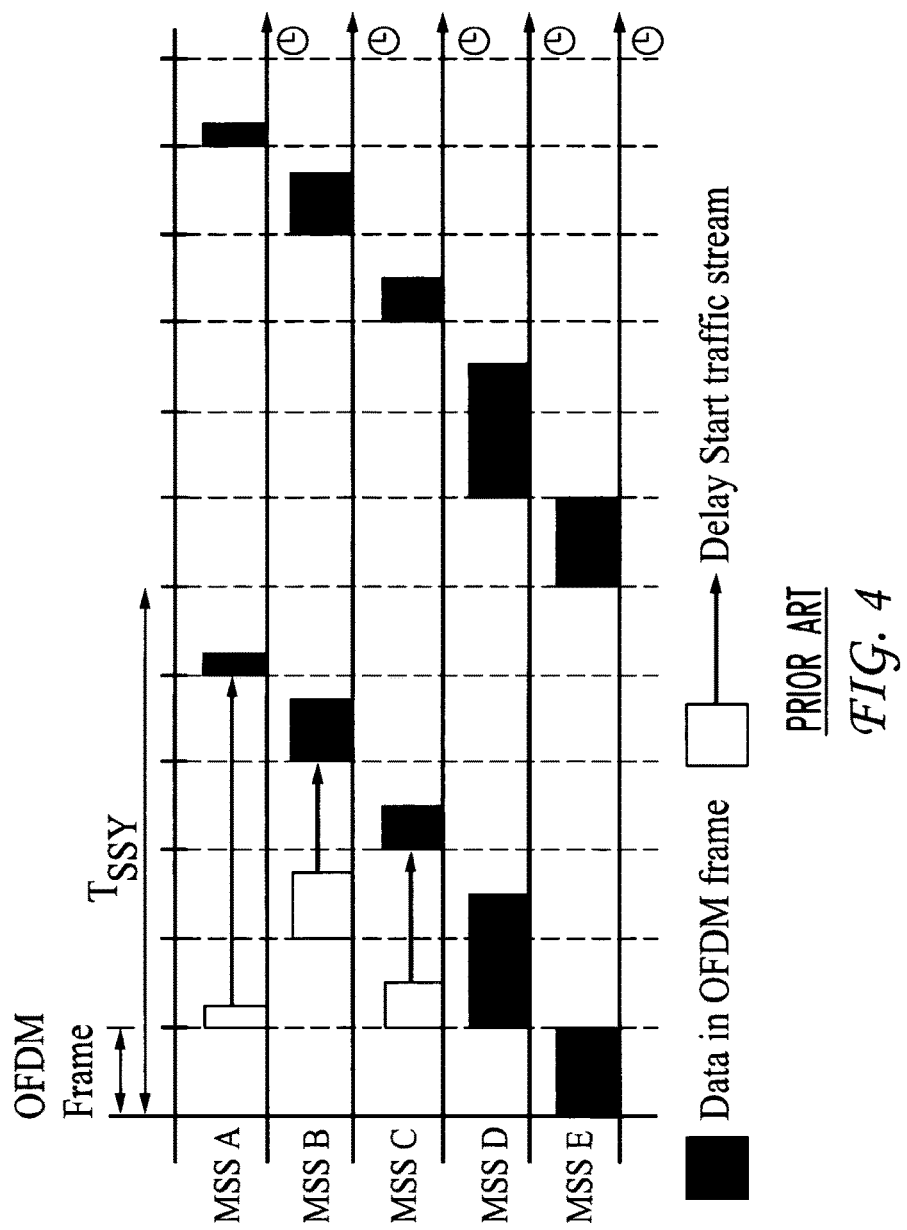
FIG. 4 is an exemplary diagram showing another power-efficient scheduling method in the prior art.

A scheduling for three MSs, which is similar to the case of FIG. 2, is shown in FIG. 5(a). As shown in FIG. 5(a), the sleep cycle periods of the three MSs are set to be integer multiples of a system scheduling cycle, for example 5 time slots in this case. As one example, the sleep cycle period of MS1 is set as 5 time slots, which is the same as that in FIG. 2. The sleep cycle periods of MS2 and MS3 are changed from 11 and 18 time slots which is shown in FIG. 2 as prior art to 10 and 15 time slots respectively in accordance with the embodiment of the invention.

In the above embodiment, the minimum value of maximum delay constrains among all the MSs, 5 time slots in this case, is set as the system scheduling cycle period. The scheduling cycle period of each MS is the maximum integer multiple of the system scheduling cycle period but is less than its maximum delay constraint. Accordingly, the listening window for receiving QoS guaranteed traffic of each MS can be calculated. Details on how to select the system scheduling cycle and the scheduling cycle period of each MS will be described later with reference to FIG. 6.

Then, as an example, in the first minimum scheduling cycle, the start frame of each MS's sleep cycle period is arranged to avoid resource collision. As a result, there will be no resource collisions in the following scheduling cycles.

According to this embodiment, if one more station, MS4 as shown in FIG. 5(b), enters the system, the scheduling scheme in FIG. 5(a) might not be able to accommodate the new traffic. In order to fully utilize the system bandwidth, or alternatively, to maximize the system capacity, some MSs having larger sleep cycle period can be shortened. In FIG. 5(c), as an example, the scheduling cycle period of MS2 is shortened from 10 frames to 5 frames, and correspondingly its listening window is shortened from 2 frames to 1 frame. As a result, one frame of resource is released by MS2 for arranging MS4 in the first system cycle period in FIG. 5(c). With this minor change to the existing MSs and setting the scheduling cycle period of new corner MS 4 to 5 frames, the traffic of MS4 can be accommodated into the system and meanwhile the power consumption of these MSs can be reduced. The MS2 that originally has larger sleep cycle period is reduced in this period for the MS4 to join the system, by which the system resources are fully and fairly utilized and at the same time power consumption can also be reduced.

According to one aspect of the present embodiment, the sleep cycle period of each MS can be kept as long as initially determined. In addition, the signalling overhead can be kept at a reasonable level. The sleep parameters (sleep period, listening window, and start frame) for real-time services are exchanged between the scheduler and each MS only once, which introduces minimum amount of signalling overhead.

Figure 6:
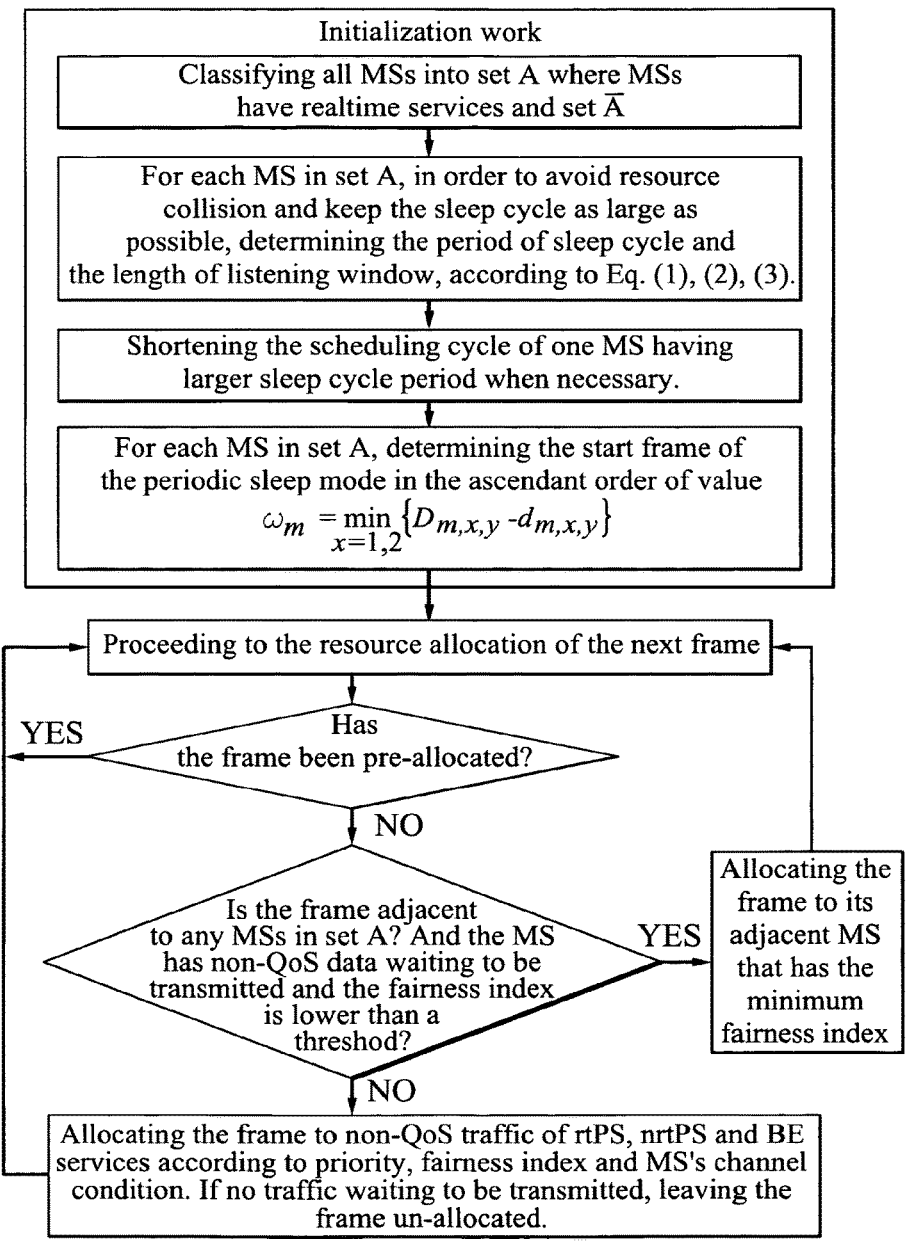
FIG. 6 is a flow chart showing the work flow of one embodiment of a power-saving scheduling method.

FIG. 6 is a flow chart showing the work flow of one embodiment of a power-saving scheduling method. For the convenience of explanation, the meaning of the notations used hereafter is given in Table 1. Different types of services and their QoS requirements are given in Table 2.

TABLE 1 definition of notations

| notation | Meaning |
| --- | --- |
| M | Total number of MSs having power-saving requirement |
| m | Index of MSs, m ∈ [1, M] |
| x | Index of service types. x = 1, 2, 3, 4 correspond to UGS, rtPS, nrtPS, BE services respectively |
| y | Index of connection |
| $C_{m,x,y}$ | yth Connection of service type x of MS m |
| $R_{m,x,y}^{min}$ | Minimum reserved bit rate for the yth connection of service type x of MS m |
| $R_{m,x,y}^{max}$ | Maximum sustainable bit rate for the yth connection of service type x of MS m |
| $D_{m,x,y}$ | Maximum packet delay constraint for the yth connection of service type x of MS m |
| $\xi_{m,x,y}$ | Tunable delay threshold of $C_{m,x,y}$; $\xi_{m,x,y} \in (0, D_{m,x,y})$. The emergency data is the data whose waiting periods exceed $\xi_{m,x,y}$. |
| $d_{m,x,y}$ | Maximum delay of the packets in buffer of $C_{m,x,y}$. |
| $T_{m,x,y}^{base}$ | Time base used to measure the traffic rate. E.g., the resources allocated to connection $C_{m,x,y}$ shall not be less than $T_{m,x,y}^{base} \cdot R_{m,x,y}^{min}$ in the interval of $T_{m,x,y}^{base}$. It is in the magnitude of second. |
| $\Omega_k$ | Capacity (bits) of a resource unit. k ∈ [1, K] depending on selected modulation & coding scheme (MCS). There are K types of MCSs. |
| $T_{frame}$ | PHY frame duration |
| $E^L$ | Energy consumed per resource unit when a MS is in wake state |
| $E^T$ | Energy consumed by sleep-to-wake state transition |

TABLE 2

Service types and their QoS parameters defined in IEEE 802.16

| | Service Type | QoS Parameters | Typical service |
| --- | --- | --- | --- |
| Real-time service | UGS (Unsolicited Grant Service) | $R_{m,1,y}^{min}$, $D_{m,1,y}$ | MPEG-2, CBR |
| | rtPS (real-time Polling Service) | $R_{m,2,y}^{min}$, $R_{m,2,y}^{max}$, $D_{m,2,y}$, $T_{m,2,y}^{base}$ | VoIP |
| None-real- | nrtPS (non-real-time Polling | $R_{m,3,y}^{min}$, $R_{m,3,y}^{max}$, $T_{m,3,y}^{base}$ | FTP |

TABLE 2-continued

Service types and their QoS parameters defined in IEEE 802.16

| Service Type | QoS Parameters | Typical service |
|---|---|---|
| time service Service) | | |
| BE (Best Effort service) | $R_{m,4,y}^{min} = 0$, $R_{m,4,y}^{max}$ | Email, etc. |

Firstly, all the MSs in the regime of a BS are classified into two sets according to the priority of services they have. In this embodiment, as an example, a real-time service has a high priority and a non-real-time service has a lower priority. Thus one set, denoted as A, comprises MSs that have real-time services and the other set, denoted as $\overline{A}$, includes the remaining MSs. A relatively static service schedule pattern can be designed to reduce power consumption of MSs in set A and satisfy their minimum QoS requirement (or "QoS Rate"). Further, the "non-QoS rate" traffic that is non-predictable is scheduled on the fly to fully utilize the remaining system resources and to achieve fairness and reduced power consumption at the same time.

Here, "QoS Rate" is defined as the instantaneous rate requirements for QoS guarantee:

$$R_{m,x,y}^q = \text{Min}\{\text{Min}\{R_{m,x,y}, R_{m,x,y}^{max}\}, \text{Max}\{R_{m,x,y}^{em}, R_{m,x,y}^{min}\}\}$$

where $R_{m,x,y}^{em}$, $R_{m,x,y}$ denote the rate to transmit the emergency data, and the rate to transmit all buffered data for the connection $C_{m,x,y}$. The emergency data is the data whose waiting period exceeds $\xi_{m,x,y}$. Accordingly, the "non-QoS rate" of a connection is defined as $$R_{m,x,y}^{nq} = R_{m,x,y} - R_{m,x,y}^q$$

The "non-QoS rate" traffics include parts of rtPS traffic, and all the nrtPS and BE data.

Then, the method firstly proceeds to a static scheduling stage for the MSs having real-time services which comprises the following steps of: (a) determining a system scheduling cycle; (b) determining the sleep cycle period of each MS and the listening window in order to keep the sleep cycle periods as large as possible and to avoid resource collision as well; and (c) adjusting the start time of each MS's sleep mode in the first system scheduling period to avoid resource collision.

As one example of the step (a), the system scheduling cycle can be the minimum delay constraints among all MSs in set A, as given in the following Equation (1).

$$T^S = \min\{T_m^C, m \in A\} \quad (1)$$

As for the step (b), the sleep cycle period of each MS and the listening window can be given by the following Equations (2) and (3).

The scheduling cycle of a MS having real-time services, $T_m^S$, is defined as $$T_m^S = \lfloor T_m^C/T^S \rfloor \cdot T^S, m \in A \quad (2)$$

The scheduling cycle of a MS is used as the sleep cycle period of the MS in set A. The listening window of the MS in A, $T_m^L$, is defined as:

$$T_m^L | (\Sigma_{x=1}^3 \Sigma_y R_{m,x,y}^{min}) \cdot T_m^s/\Omega_1 | = \lceil R_m^{min} \cdot T_m^s/\Omega_1 \rceil, m \in A \quad (3)$$

In Equation (3), the number of frames allocated to a MS is calculated based on the minimum capacity of a frame. This gives room to the adjustment and scheduling of the unpredictable traffics because the capacity of a frame can increase when the channel condition between the MS and the BS becomes better. Besides, since the periodic wakeup of the MSs having real-time services (UGS, rtPS) is inevitable, it is better to fully utilize each listening window to also transmit the "QoS rate" of nrtPS connections.

Correspondingly, the sleep window of the MS is:

$$T_m^I = T_m^S - T_m^L (\text{frames})$$

As described above, the start time of each MS's sleep mode in the first system scheduling period is adjusted by the step (c) to avoid resource collision. Since there is no collision in the first system scheduling period, there will be no collisions in all the following scheduling cycles.

Specifically, the sleep cycle period of a MS having real-time services, $T_m^C$, is defined as $$T_{m,x,y}^C = \lfloor \xi_{m,x,y}/T_{frame} \rfloor, x \in [1,2] (\text{frames})$$

$$T_m^C = \min\{y \in [1, T_{m,UGS}]^{min}\{T_{m,1,y}^C\}_{y \in [1, Y_{m,rtPS}]}^{min}\{T_{m,2,y}^C\}\}$$

According to the equation (1), the system scheduling cycle can be the minimum delay constraints among all MSs in set A. As an alternative, the optimum value of system scheduling cycle period and each MS's scheduling cycle period can be obtained by jointly optimizing a power efficiency function. Specifically, let the scheduling cycle of a MS m, $T_m^S$, be integer multiple of the system scheduling cycle period under the constraint of being no larger than the independent sleep cycle period of the MS. That is, mathematically, $$T_m^S = n_m \cdot T^S \quad (4)$$

where the integer $n_m$ satisfies $1 \leq n_m \leq \lfloor T_m^C/T^S \rfloor$.

Obviously, when $n_m = \lfloor T_m^C/T^S \rfloor$, Equation (5) equals to Equation (2). The power efficiency function $f(T^s, \vec{n})$ has two variables, $T^s$ and a variable set $\vec{n}$, $\vec{n} = \{n_m, m \in [1, M_A]\}$. The optimum system scheduling cycle period $T^{S*}$ and the optimum scheduling cycle period of all MSs $\vec{n}*$ are obtained by maximizing the power efficiency function as follows:

$$(T^{S*}, \vec{n}*) = \arg\max f(T^S, \vec{n}) = \arg\max\left(\sum_{m=1}^{M_A} (T_m^S - T_m^L)\right) \quad (5)$$

$$= \arg\max\left(\sum_{m=1}^{M_A} (n_m \cdot T^S - \lceil R_m^{min} \cdot n_m \cdot T^s/\Omega_1 \rceil)\right)$$

So long as total traffic of the MSs is within the system capacity, an optimum solution pair can be obtained by solving Equation (5). Enumeration is a simple way to find the optimum solution. But when the variable space is large, the enumeration method can be computation-consuming, and some heuristic algorithms such as Equations (1), (2) and (5), may be used alternatively.

In the method as shown in FIG. 6, when the number of MSs is increased because of joining of new MSs, the sleep cycles of the MSs having large sleep cycle periods, set in the steps of (a) and (b), can be shorten to fully utilize the system bandwidth to accommodate more MSs. One example of algorithm to adjust the sleep cycle is shown in FIG. 7, which will be described in more detail later.

Next, the method proceeds to the on-the-fly scheduling stage in which the scheduler allocates the remaining sporadic resources to "non-QoS" traffics. The on-the-fly scheduling includes following steps of: (d) if the frame has not been allocated in the static stage but its adjacent MS is in set A and has data waiting to transmit, allocating the frame to its adjacent MS according to the priority of services and then to the fairness principle; and if the fairness index is higher than a threshold, releasing the frame for other MSs' non-QoS traffics waiting to be transmitted; (d) allocating the frame to non-QoS traffic of rtPS, nrtPS and BE services according to priority, fairness index and MS's channel condition; if no traffic waiting to be transmitted, leaving the frame un-allocated; (e) when there are several MSs in set $\overline{A}$ having services of equal conditions (e.g., priority), allocating the resource to the MSs having good channel conditions. The rationale behind is that, if the transmission error is high, it is actually a waste of power of MS to wake up to receive the data.

Figure 7:
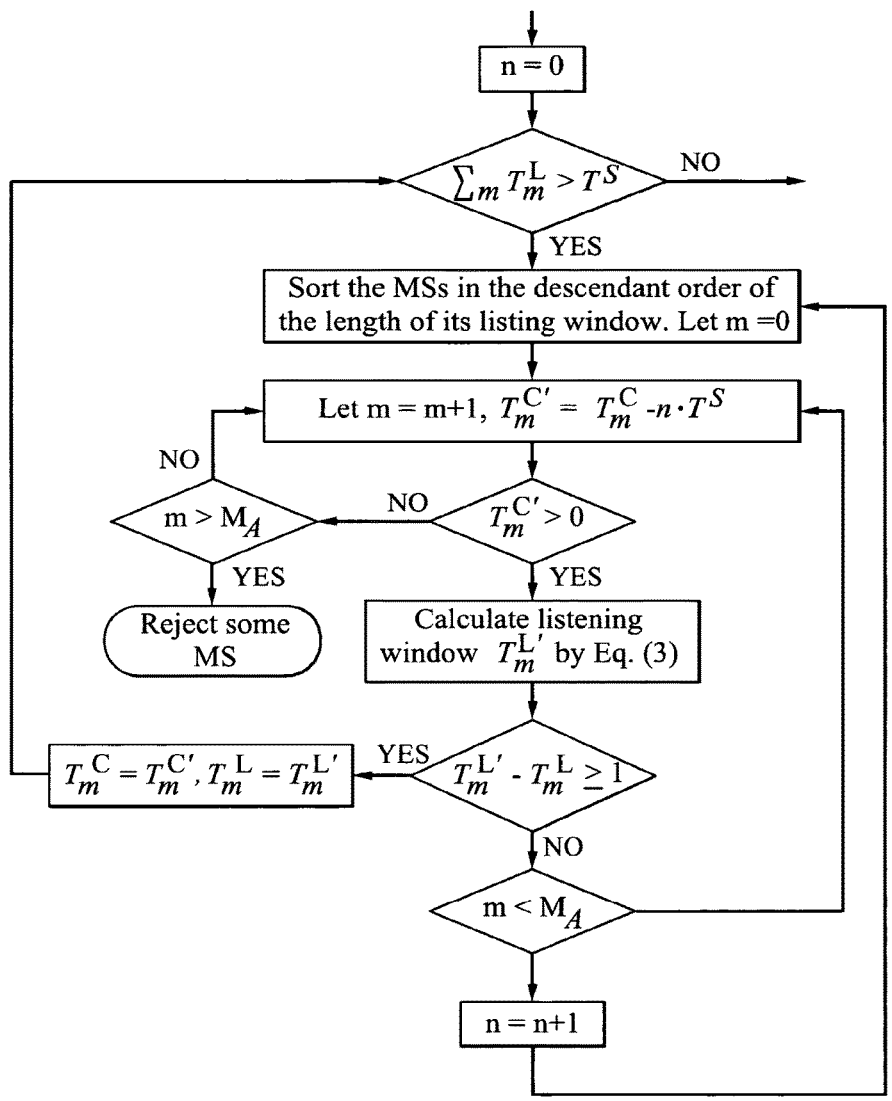
FIG. 7 is a flow chart showing the work flow of a method to adjust sleep cycle periods of the MSs.

Referring now to FIG. 7 which shows the work flow of a method to adjust sleep cycle period of the MSs having larger sleep cycles in order to fully utilize the system bandwidth to accommodate more MSs and simultaneously to let each MS keep its sleep cycle as longer as possible. Specifically, if the listening windows of each MSs in set A can not be scheduled without resource collision in one system scheduling cycle period, as shown in Eq. (4), then the sleep cycle period of some MSs should be shortened.

$$\Sigma_{m=1}^{M_A} T_m^L > T^S \qquad (6)$$

where $M_A$ denotes the number of MSs in set A.

For the adjustment of the sleep cycle period of the MSs, several problems should be considered, for example, which MS(s) will be influenced and how many frames long should their sleep cycle period be? Different choices may result in different power-saving performance. In the algorithm shown in FIG. 7, the sleep cycle period is shortened by one system scheduling period first, then two system scheduling periods, and so on. In each iteration of sleep cycle period adjustment, the MSs having larger listening window will be considered firstly. The MS, which can release one unit of resource (e.g., one frame) when its sleep period is shortened, will be chosen firstly to change its sleep period, and the MS which can not release one unit of resource will keep its sleep period unchanged. The iteration will stop when all MSs can be accommodated by the system. If the sleep period of all MSs in set A have been shortened to the system scheduling period and the condition in Equation (4) still can not be satisfied, the system will have to reject the new corner MS(s).

It is to be understood that numerous modifications may be made to the illustrative embodiments and that other arrangements may be devised without departing from the spirit and scope of the present invention as defined by the appended claims.

The invention claimed is:

1. A method for scheduling power save cycles by a central device in a wireless network comprising a plurality of wireless devices, said method comprising:

determining a system reference cycle as a minimum value of a delay constraint on a real-time service for each wireless device of said plurality of wireless devices that has a real-time service;

attributing a length of a power save cycle to each wireless device, wherein each power save cycle length is an integer multiple of the system reference cycle and wherein the integer value is varied to form a difference between the power save cycle length for each of the plurality of wireless devices;

assigning a sleep period and a wake period within the power save cycle of each wireless device using the predetermined power save cycle length; and arranging the power save cycle of each wireless device to avoid collision of the wake period with those of other wireless devices.

2. The method according to claim 1, wherein the step of arranging the power save cycle of each wireless device comprises adjusting the starting time of the power save cycle of each wireless device to avoid collision of the wake period with those of other wireless devices.

3. The method according to claim 1, wherein one or more wireless devices have a service with a high priority.

4. The method according to claim 3, wherein a real-time service has the high priority.

5. The method according to claim 4, wherein the power save cycle length of a wireless device having real-time service is attributed as the maximum integer multiple of the system reference cycle under the constraint of being no larger than the maximum delay requirement on real-time service of the wireless device.

6. The method according to claim 4, wherein the wake period of a wireless device is set based on the QoS requirement of the real-time service of the wireless device.

7. The method according to claim 1, further comprising changing the power save cycle lengths of one or more wireless devices having larger power save cycle lengths to a smaller integer multiple of the system reference cycle when new wireless devices associate with the central device.

8. A method for scheduling power save cycles of a wireless device, comprising:

receiving from a central station scheduling data for a sleep/wake cycle, wherein a sleep/wake cycle length is defined as an integer multiple of a system reference cycle that is common for a plurality of wireless devices and that is set as a minimum value of a delay constraint on real-time service for each wireless device of said plurality of wireless devices that has a real-time service, and wherein the integer value is varied between wireless devices to form a difference between a power save cycle length for each wireless device; and waking and setting to sleep the appropriate circuits as a function of the scheduling data using the predetermined sleep/wake cycle length.

9. The method according to claim 8, wherein the power save cycle length is attributed as the maximum integer multiple of the system reference cycle under the constraint of being no larger than the maximum delay requirement on real-time service of the wireless device.

10. The method according to claim 8, wherein the wake period of a wireless device is set based on the QoS requirement of the real-time service of the wireless device.

11. The method according to claim 8, wherein the scheduling data changes the power save cycle length to a smaller integer multiple of the system reference cycle when other wireless devices associate with the central station.

12. A central device for scheduling power save cycles in a wireless network comprising a plurality of wireless devices, said central device being configured to:

determine a system reference cycle as a minimum value of a delay constraint on a real-time service for each wireless device of said plurality of wireless devices that has a real-time service;

attribute a length of a power save cycle to each wireless device, wherein each power save cycle length is an integer multiple of a system reference cycle and wherein the integer value is varied to form a difference between the power save cycle length for each of the plurality of wireless devices;

assign a sleep period and a wake period within the power save cycle of each wireless device using the predetermined power save cycle length; and arrange the power save cycle of each wireless device to avoid collision of the wake period with those of other wireless devices.

13. The central device according to claim 12, wherein the central device is configured to adjust the starting time of the power save cycle of each wireless device to avoid collision of the wake period with those of other wireless devices.

14. The central device according to claim 12, wherein one or more wireless devices have a service with a high priority.

15. The central device according to claim 14, wherein a real-time service has the high priority.

16. The central device according to claim 14, wherein the power save cycle length of a wireless device having real-time service is attributed as the maximum integer multiple of the system reference cycle under the constraint of being no larger than the maximum delay requirement on real-time service of the wireless device.

17. The central device according to claim 14, wherein the wake period of a wireless device is set based on the QoS requirement of the real-time service of the wireless device.

18. The central device according to claim 12, wherein the device is further configured to change the power save cycle lengths of one or more wireless devices having larger power save cycle lengths to a smaller integer multiple of the system reference cycle when new wireless devices associate with the central device.

* * * * *